L. V. LEWIS.
TRAIN CONTROL SYSTEM.
APPLICATION FILED OCT. 25, 1916.

1,365,838.

Patented Jan. 18, 1921.
5 SHEETS—SHEET 3.

WITNESSES

INVENTOR
Lloyd V. Lewis
by A. L. Vencill
His attorney

L. V. LEWIS.
TRAIN CONTROL SYSTEM.
APPLICATION FILED OCT. 25, 1916.

1,365,838.

Patented Jan. 18, 1921.
5 SHEETS—SHEET 4.

WITNESSES

INVENTOR

L. V. LEWIS.
TRAIN CONTROL SYSTEM.
APPLICATION FILED OCT. 25, 1916.

1,365,838.

Patented Jan. 18, 1921.
5 SHEETS—SHEET 5.

WITNESSES

INVENTOR

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

TRAIN-CONTROL SYSTEM.

1,365,838.  Specification of Letters Patent.  Patented Jan. 18, 1921.

Application filed October 25, 1916. Serial No. 127,576.

*To all whom it may concern:*

Be it known that I, LLOYD V. LEWIS, a citizen of the United States, residing at Edgewood borough, in the county of Allegheny and State of Pennsylvania, have invented certain new and useful Improvements in Train-Control Systems, of which the following is a specification.

This invention relates to railway train controlling systems and has particular application to a speed control system.

The paramount characteristic of this invention resides in the provision of a speed control system for railway vehicles in block sections for obtaining maximum track capacity.

Another characteristic of this invention is to provide a system of this character which is entirely electrical and completely automatic in its operation.

Another characteristic resides in the provision of such a system in which a plurality of currents of different characters are employed, and vehicle-carried means selectively responsive to said currents for controlling the speed and progress of the vehicle.

Other characteristics of this invention will appear from the following detailed description, taken in connection with the accompanying drawings forming a part of this specification, with the understanding, however, that the embodiments illustrated, though practical, are by no means the only embodiments which my invention may assume, wherefore the invention is not confined to any strict conformity with the showing of the drawings, but may be changed and modified in various particulars, so long as such changes and modifications make no material departure from the spirit and scope of the appended claims.

Figure 1:
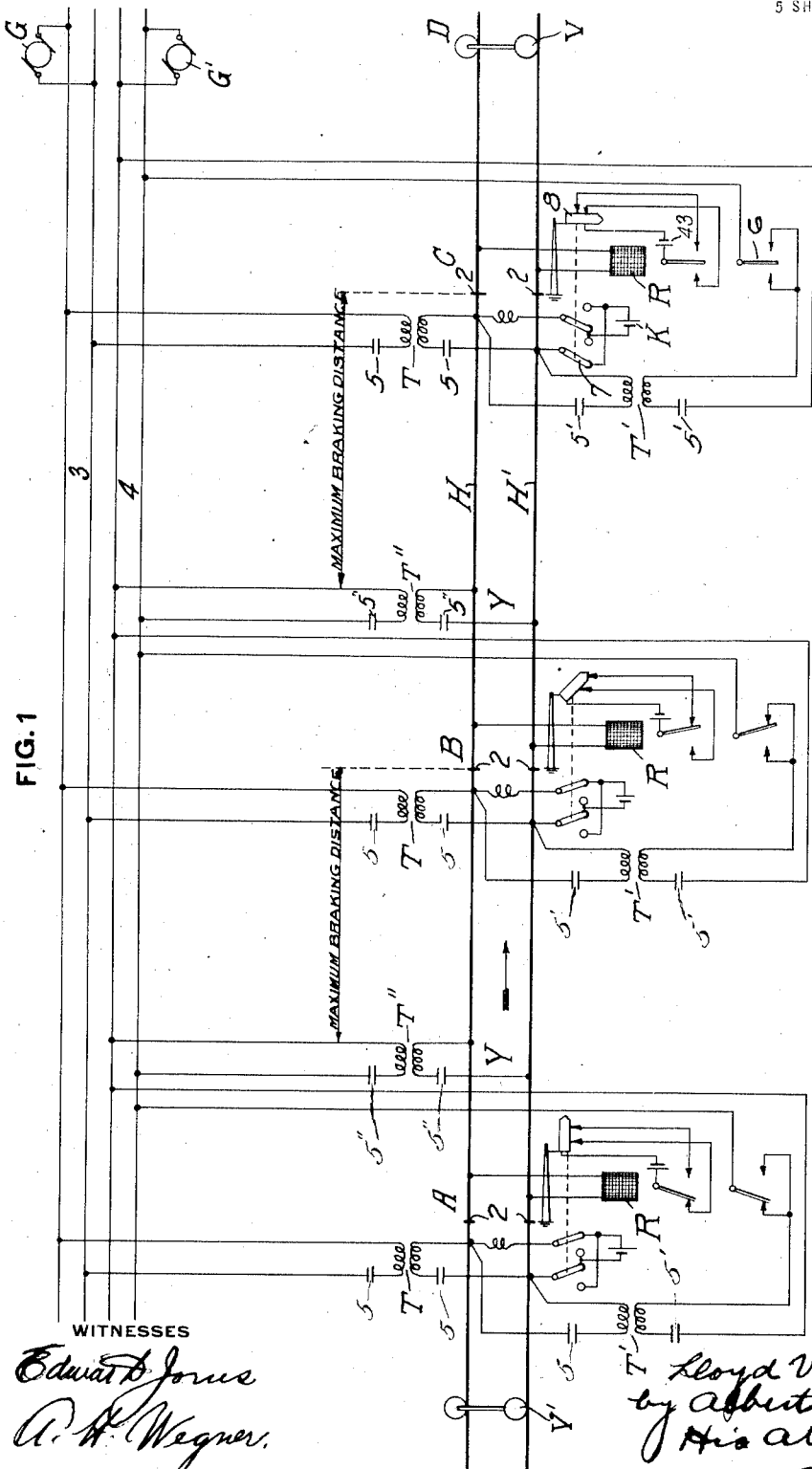
Figure 2:
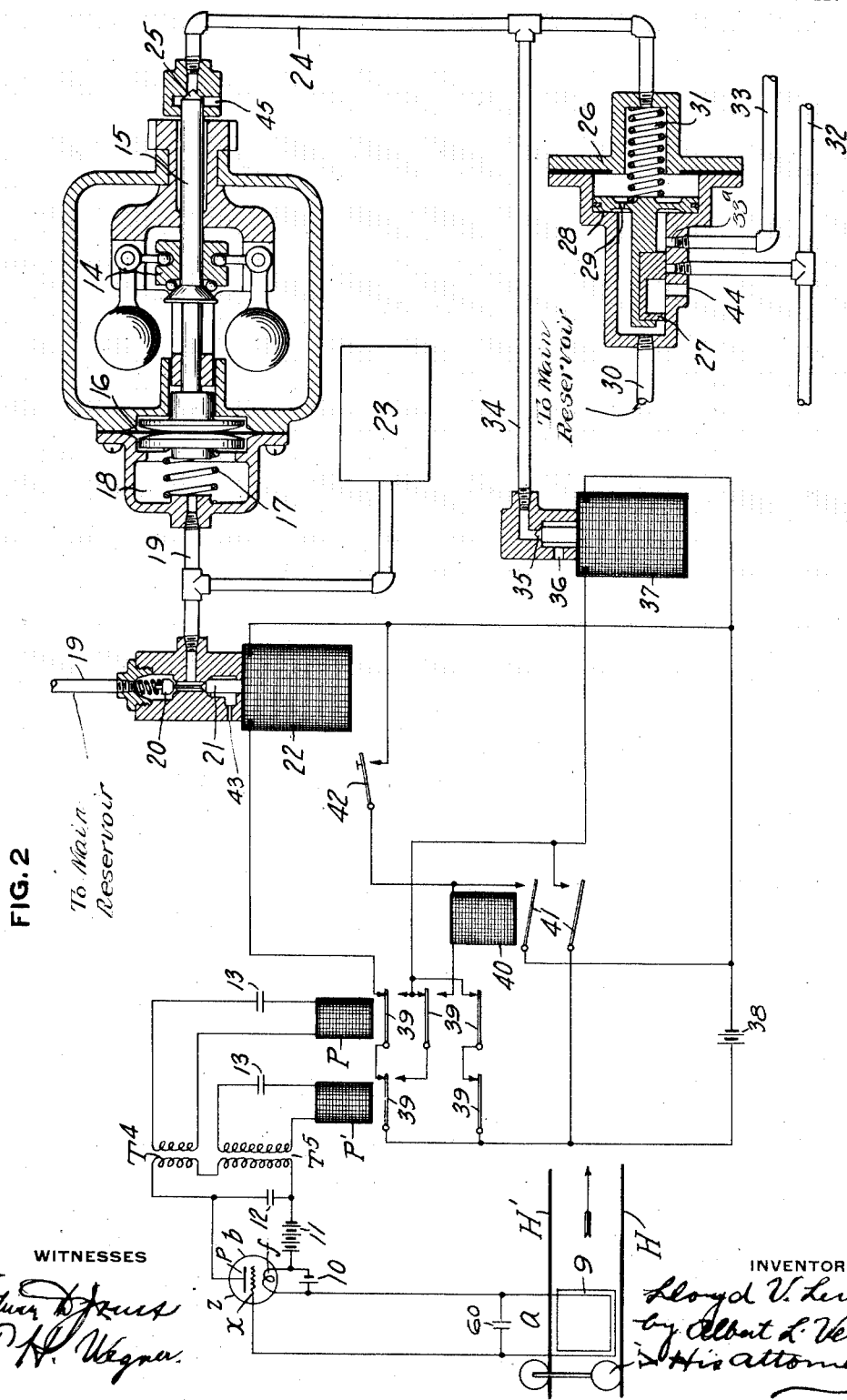
Figure 3:
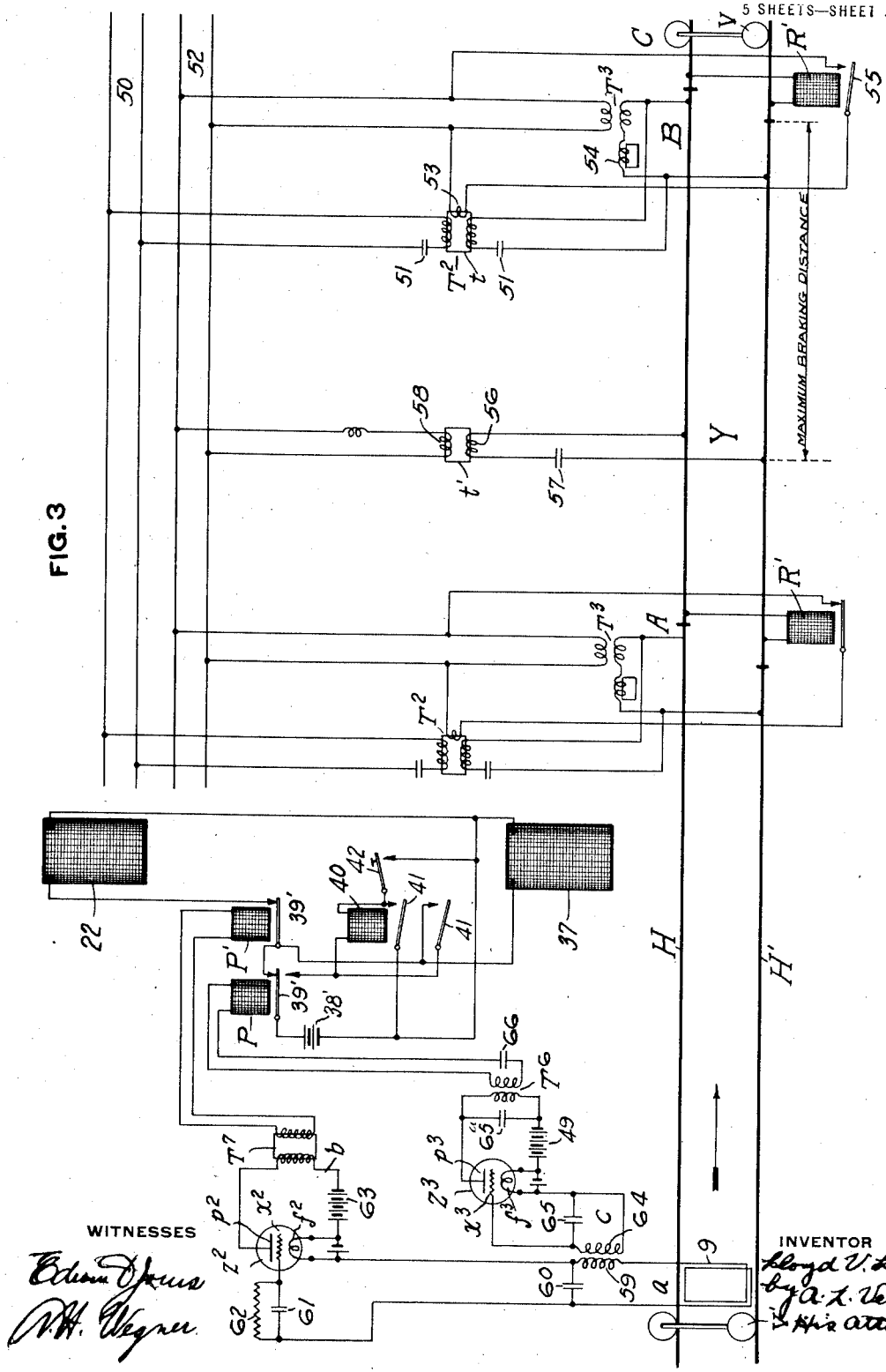
Figure 4:
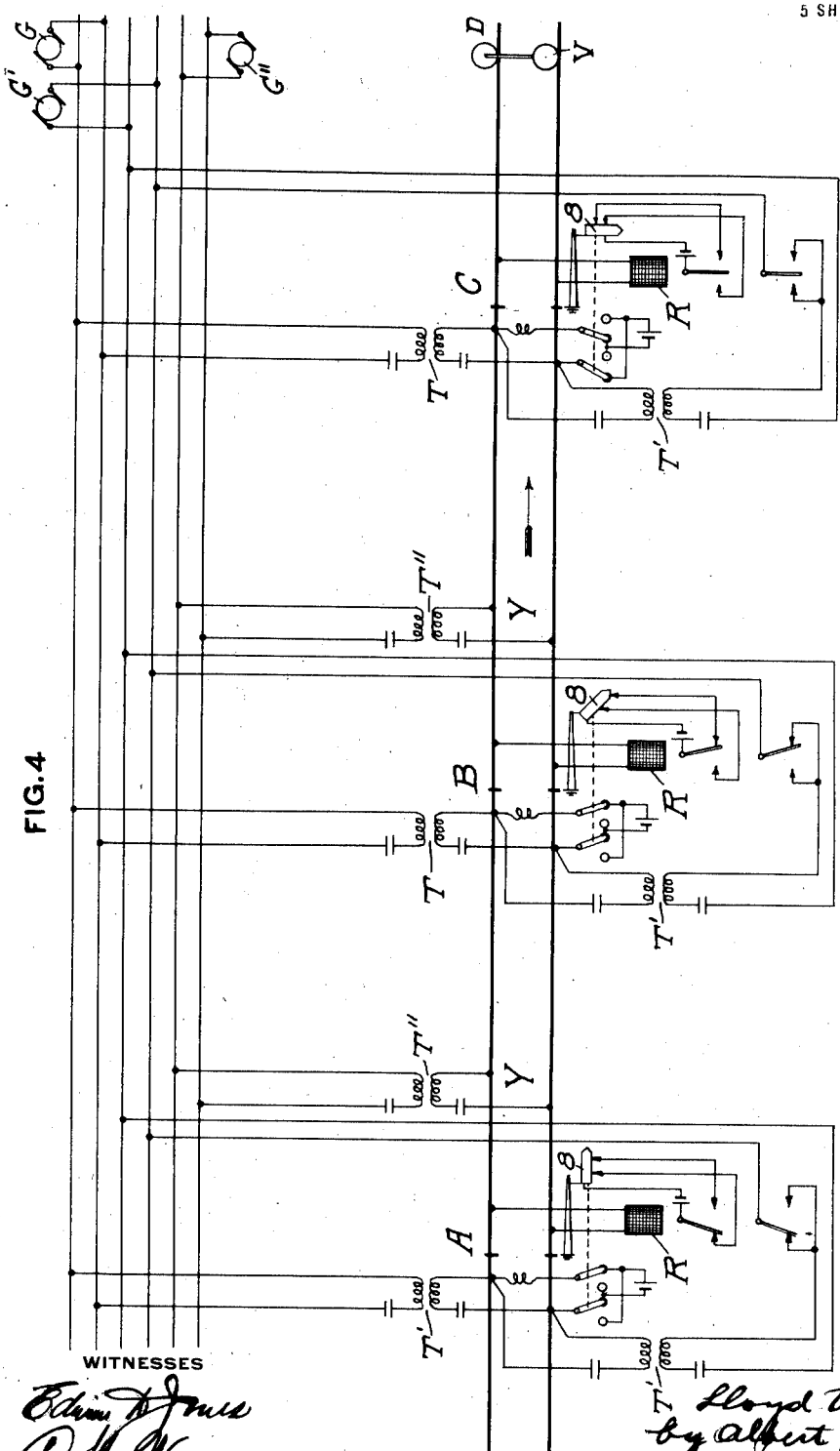
Figure 5:
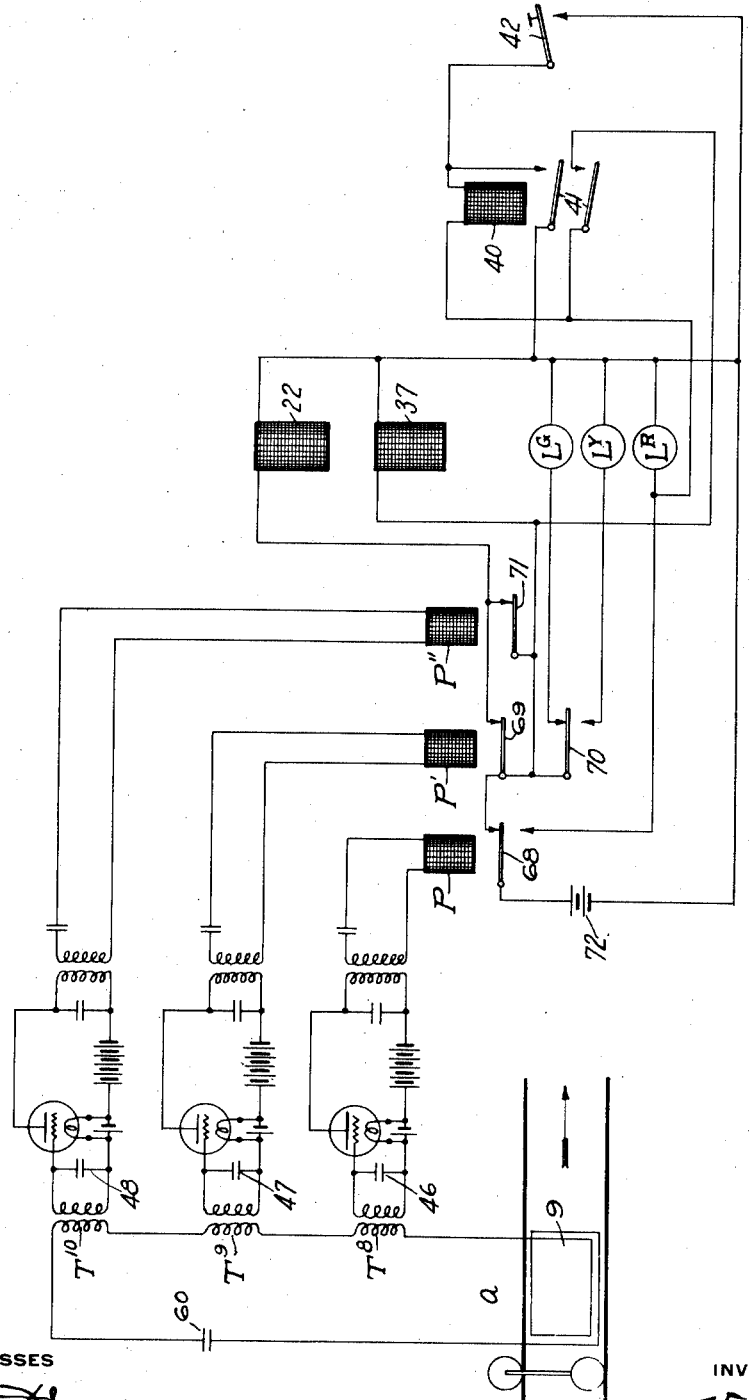

In the drawings, Figure 1 is a diagrammatical view showing one form of trackway apparatus used in my speed control system; Fig. 2 is a diagrammatical view of a vehicle carried receiving circuit and controlling means which may be used in conjunction with the trackway apparatus shown in Fig. 1, the controlling means being shown partly in section; Fig. 3 is a diagrammatical view showing one complete speed controlling system and is a modified arrangement of that shown in Figs. 1 and 2; Fig. 4 is a diagrammatical view showing a modified form of trackway apparatus shown in Fig. 1; Fig. 5 is a diagrammatical view of vehicle-carried receiving circuits which may be used in conjunction with the track system shown in Fig. 4.

Similar reference characters refer to similar parts in each of the several views.

Referring to Fig. 1, reference characters H and H' designate the track rails of a railway over which traffic normally moves in the direction indicated by the arrow. The rails are divided into block sections A—B, B—C, etc., by means of the insulated joints 2, 2. In this instance I have shown each of the rails divided by such joints, but it is immaterial how the segregation of the block sections is accomplished or whether or not both of the rails are provided with such joints, as this system may operate equally as well with only one of the rails segregated.

In Fig. 1 I have shown the preferred embodiment of my invention, in which continuous speed control of a railway vehicle in any block section is obtained by means of impressing upon the rails of each section signaling currents of different characters. In this embodiment the signaling currents are alternating and differ in frequency, the two frequencies being impressed upon the rails of each section adjacent the exit end thereof. The supply of one current is controlled in accordance with traffic conditions in advance of each section, and current of this same frequency is also supplied to the rails at another point within each section, which point is at substantially the maximum braking distance in the rear of the exit end of the section. In conjunction with this track system I employ a railway vehicle controlling means containing relays which are selectively responsive to said currents for controlling the speed and progress of the vehicle, as will be more fully described hereinafter.

As here shown, the two signaling currents for each section are produced by means of generators G and G', respectively, and are supplied to the track rails through transmission mains 3 and 4, respectively, and transformers T and T', respectively. To avoid complexity of description I will designate that signaling current which is supplied by the generator G by the letter $g$, while the remaining current is designated as $g'$. The signaling current $g$ is continuously supplied to each block section by means of the transformer T, as previously stated, the primary and secondary of which are tuned to current of this frequency by means of condensers 5. The secondary of transformer T is connected directly across the rails of the section adjacent the exit end thereof and it will therefore be seen that in view of this connection each block for its entire length will be constantly supplied with a current of this frequency. The current $g'$ is applied to each section at two points, one of which is adjacent the exit end, while the other is at substantially the maximum braking distance in the rear of the exit end of each section, which latter point is designated by the letter Y. The transformer T' which supplies current $g'$ to each section at a point adjacent the exit end thereof has its primary and secondary tuned to this frequency by means of condensers 5', the secondary having its terminals connected across the track rails H and H'. The supply of current $g'$ is controlled by traffic conditions in the section in advance through the medium of a polarized relay R connected across the rails of each section adjacent the entrance end thereof. The relay R comprises a contact 6, the latter being capable of assuming two positions to close the circuit controlling the transformer T', the direction of movement of the contact depending upon the direction of current flowing through the polarized relay R, and the contact assuming a third position in which it opens the circuit of transformer T' when the relay is deënergized. Relay R of each section is supplied with energy from a battery K, the polarity of the battery current in the rails being determined by a pole-changer 7 operated in the usual manner by an adjacent signal 8. These signals 8 are controlled by relays R in a usual manner. As previously stated, the current $g'$ is supplied at another point in each section which is approximately maximum braking distance from the exit end of the section by means of a transformer T'', the primary of which is connected to the transmission mains 4, while the secondary is connected across the track rails H and H'. The primary and secondary of each transformer T'' are tuned to resonance at frequency $g'$ by means of condensers 5''. As the connection at point Y is independent of the connections for the currents $g$ and $g'$ at the exit end of each section, it is evident that the current $g'$ at this point is constantly supplied to the rails of the section.

In Fig. 2 I have shown a vehicle-carried speed governing means and controlling circuits therefor which are responsive to and are controlled by the signaling currents in the track rails. The electrical means for controlling the speed governing apparatus comprises relays P and P', and a coil 9 arranged in inductive relation to the rails H and H' in advance of the foremost axle of the vehicle or train. The coil 9 and a condenser 60 are included in a resonant circuit $a$ tuned broadly to the mean of the two frequencies $g$ and $g'$, supplied to the track rails by the generators G and G'. Between the resonant circuit $a$ and the relays P and P' I have provided means for selecting and amplifying the respective currents. The amplifier, designated Z, comprises a bulb $b$, plate $p$, a grid $x$ and a filament $f$, the grid being interposed between the plate and filament. The filament $f$ is constantly heated by a battery 10. A second battery 11 is included in a circuit comprising a condenser 12, the plate $p$ and the filament $f$. The terminals of the condenser 60 are connected across the terminals of coil 9 and to the filament $f$ and the grid $x$. It will therefore be evident that when alternating current is induced in the coil 9, the resonant circuit $a$ will produce an oscillating difference of potential between the filament $f$ and the grid $x$, which, owing to the liberation of electrons from the heated filament will cause corresponding variations which may be made much greater in magnitude in the current of battery 11. Connected across the terminals of the condenser 12 are the primaries of transformers $T^4$ and $T^5$, the secondaries of which are connected in two resonant circuits including the condenser 13 and the relays P and P', which circuits are tuned respectively to the two frequencies $g$ and $g'$ supplied to the track rails. The relay P is therefore responsive to the signaling frequency $g$, and the relay P' is responsive to the frequency $g'$, hence the energization of said relays is dependent upon the presence of the signaling frequencies in the track rails.

The speed controlling means carried upon the vehicle is adapted to be controlled by the signaling frequencies in the track rails through the medium of the relays P and P'; and, as the speed controlling means is subject matter of a previous patent application, the same will be briefly described in its relation to the present system, as follows: A centrifuge 14 is geared to an axle of the vehicle to impart longitudinal movement in one direction to a shaft 15, the movement of which is opposed by means of fluid pressure upon a diaphragm 16 and a spring 17 contained in a chamber 18. Fluid pressure is supplied to the chamber 18 by a pipe 19 from the main reservoir of the air brake system, (not shown), a pin valve 20 being arranged within the pipe 19 for controlling the flow of fluid from the reservoir. A second pin valve 21 in the pipe 19 controls the exhaust of the fluid pressure to atmosphere through port 43, this valve and valve 20 being simultaneously controlled by an electromagnet 22. Gradual reduction of the pressure in chamber 18 is accomplished by a timing reservoir 23 communicating with pipe 19, and by the restricted area of exhaust port 43. When the pressure exerted on diaphragm 16 by the centrifugal device exceeds the pressure exerted on the diaphragm by the fluid pressure and spring 17, shaft 15 will move to the left and so open a valve 25 which then opens a pipe 24 to atmosphere through an exhaust port 45. The pipe 24 communicates with a chamber 26 in which is mounted a slide valve 27. The valve 27 is provided with a piston 28 for actuating the same, the head of which is formed with an orifice 29. Fluid pressure is admitted to the valve chamber 26, and to one side of the piston head 28 from the main reservoir by means of a pipe 30, a portion of the fluid escaping through the opening 29 to the opposite side of the piston head whereby, assuming that the valve 25 is closed, the fluid pressure in the pipe 24 will react to balance the pressure upon the opposite side, with the assistance of a spring 31, to retain the valve in closed position, as shown. The valve 27 controls the supply of fluid pressure to the air brake system by means of a port 33ª which normally connects a pipe 33 with the main reservoir, said pipe 33 being the sole source of fluid pressure supply to the air brake system. Valve 27 also controls the exhaust of fluid pressure from the brake pipe 32 through port 44 for effecting an application of the brakes. When the pressure upon the right side of the piston head is reduced, the valve will move to the right, causing the supply of fluid pressure to the air brake system to be cut off by cutting off communication between pipe 30 and pipe 33. This movement of valve 27 also opens brake pipe 32 to atmosphere through port 44, and so causes an application of the brakes. An application of the brakes may also be accomplished by means of a branch pipe 34 communicating with the pipe 24, the exhausting of the fluid pressure therefrom being controlled by a pin valve 35 and a port 36, the former being actuated by means of an electromagnet 37; when the magnet is energized the valve is in closed position.

Although I have described a specific speed controlling means, I wish it to be clearly understood that any form of apparatus may be used for this purpose, without departing from the spirit of this invention.

Having thus described the speed controlling apparatus and the manner in which the signaling currents are selected to energize the relays P and P′, I will now describe the coöperation between the two for effecting the continuous control of the speed and progress of the vehicle.

The magnets 22 and 37 are normally energized from a battery 38 to retain their respective pin valves 21 and 35 in closed position and are controlled by means of the relays P and P′, through the medium of the contacts generally indicated at 39. It is thought unnecessary to describe the circuits controlled by the contacts 39 for energizing the magnets 22 and 37, and it will suffice to state that when the relays P and P′ are both energized the respective contacts controlled thereby will engage the upper contact points so as to close the circuits of the magnets 22 and 37 to energize the same. When relay P′ is deënergized, its contacts will be opened to deënergize the magnet 22 so as to cause valve 20 to close and valve 21 to open, thus initiating the reduction of pressure in chamber 18. When relay P is deënergized and relay P′ energized, the same action occurs as when relay P alone is energized. In the event that both of the relays are deënergized contacts will also be opened to deënergize magnet 37 to cause the vehicle to be brought to a stop.

To permit the manual release of the brakes after they have been applied by the deënergization of magnet 37, I provide a stop release magnet 40 which is adapted to control contacts 41 for energizing the magnet 37. The magnet 40 is controlled by means of a manually operated switch 42 whereby when the relays P and P′ are both deënergized the circuit controlling the magnet 40 may be closed through the switch 42, thus causing lower contact 41 to close the circuit controlling magnet 37. The closing of relay 40 closes a stick circuit for the same including back contacts of relays P and P′, whereby relay 40 remains closed until either relay P or P′ is subsequently energized.

Having thus described the track circuits and the vehicle-carried means, I will now briefly describe the operation of the entire system. Assuming that the block section C—D is occupied by a vehicle V, it will be evident from the foregoing description that the relay R for this block section will be deënergized, thus causing the circuit of the adjacent transformer T′ to be broken and the supply of current $g'$ consequently discontinued at this point in section B—C. This latter current continues, however, to be supplied to the rails of section B—C at the point Y. Assuming now that a second vehicle V' equipped with the apparatus shown in Fig. 2 enters block A—B; inasmuch as both of the signal currents are supplied to the track rails of this block throughout their entire length the relays P and P' are both energized so that magnets 22 and 37 are both energized and the speed of the vehicle is not retarded at any point in the block. As this second vehicle V' enters block section B—C, it receives both currents until the train reaches the point Y so that up to this point the speed continues to be unretarded. As soon as the vehicle V' passes point Y, however, it ceases to receive current of the frequency $q'$ because source T" will be cut off from coil 9 by the wheels and axles of the vehicle V' so that relay P' becomes deënergized, thereby deënergizing speed control magnet 22, opening valve 21, and so initiating a reduction in the fluid pressure in reservoir 23 and chamber 18. The fluid pressure upon diaphragm 16 therefore gradually decreases at a rate determined by the volume of reservoir 23 and area of orifice 43 so that the force exerted by the centrifuge 14 may eventually overcome the air and spring pressure, permitting the centrifuge to open to cause the valve 25 to open to apply the brakes. It will be manifest that the action of the centrifuge is dependent upon the speed of the vehicle; that is, if the speed is high, a slight reduction in the pressure in chamber 18 is sufficient to cause the centrifuge to open, and conversely, a great reduction in pressure is required when the speed is low. Thus it will be seen that if the vehicle V' passes point Y at maximum speed, the centrifuge will act at once to open valve 25 and thus reduce the speed by an application of the brakes, while if it passes point Y at a speed less than maximum the centrifuge will act at some point beyond Y. If the volume of reservoir 23 and the area of orifice 43 are properly proportioned to the stopping power of the vehicle, it will therefore be brought to a stop at approximately the same point C, whatever its initial speed. However, if the speed of the vehicle remains within the speed limit determined by the pressure upon diaphragm 16, the vehicle may approach point C without an application of the brakes due to the centrifuge, the final speed limit after the fluid pressure is completely exhausted from chamber 18 being a constant low value determined by the force exerted by spring 17. As soon as vehicle V' passes point C and enters the section already occupied by vehicle V, it is evident that both frequencies $g$ and $q'$ will be cut off from the section of track between the two vehicles due to the shunting effect of the wheels and axles of the vehicles, resulting in the deënergization on vehicle V' of the other relay P and magnet 37, causing the fluid pressure in pipes 34 and 24 to be exhausted to atmosphere through exhaust port 36, thereby applying the brakes to bring the vehicle V' to a full stop. If the operator of the vehicle now desires to release the brakes, this may be accomplished by the energization of magnet 40 by means of the manually operated switch 42, causing magnet 37 to be again energized to close valve 35 to permit an equalization of pressures in valve 26 to cause the valve to return to the release position, as has been described. The vehicle V' may therefore continue through section C—D at a low speed determined by the force exerted by spring 17.

From the foregoing description, it will be seen that means are provided for automatically preventing a vehicle from entering an occupied block section which so operates that the minimum distance between the vehicle and the entrance to the occupied block section is under all circumstances consistent with the stopping power of the vehicle. It is furthermore to be noted that when vehicle V' is at any point in portion Y—C of section B—C and vehicle V moves out of section C—D, relay R will be energized to close contact 6 to supply the second frequency $q'$ to section B—C and to vehicle V', which will energize relay P permitting vehicle V' to immediately accelerate to full speed, thus eliminating unnecessary retardation and resulting in a maximum traffic capacity.

In Fig. 3 I have shown another form of speed control system in which a high frequency alternating current is employed for one signaling medium, while another signaling medium is formed by periodically varying the amplitude of this current to obtain a "beat" frequency. This periodic variation may be obtained in any suitable manner, although in this instance it is accomplished by means of a low frequency alternating current. The high frequency current is continuously supplied to each block section by means of the transformer $T^2$ which has its primary connected to the transmission mains 50, while its secondary is connected directly across the rails of the block section adjacent the exit end thereof. The primary and secondary of this transformer are connected by means of a laminated iron core $t$, while the respective circuits of the primary and secondary are made resonant to current of the frequency supplied to line 50 by means of the condensers 51. The low frequency current is supplied by the transmission mains 52 to which is connected a winding 53, surrounding the iron core $t$ so that when the same is energized the current will saturate the core $t$ intermittently whereby the inductances of the primary and secondary of the transformer will be periodically varied, thereby producing corresponding variations in the amplitude of the high frequency current, as will be understood by those versed in this art. The supply of the low frequency current to the core $t$ is controlled by means of contact 55 of relay R' which is connected to the track rails of the section in advance and to which current of the low frequency is supplied by the corresponding transformer $T^3$. The primary of this transformer is connected directly to the mains 52, while its secondary is connected to the track rails. An iron core impedance coil 54 is connected in series with the secondary of transformer $T^3$ to limit the flow of current when the track circuit is occupied and to prevent interference of the high and low frequencies. Inasmuch as relay R' of each section is energized by the transformer $T^3$ of that section, it will be evident that relay R' is only energized when that section is unoccupied and that the amplitude of the high frequency in one section is periodically varied only when the section in advance is unoccupied.

In conjunction with this means of obtaining two signaling means, in each section, I employ a shunt resonant to the high frequency current, for impressing the varied amplitude of said current upon the rails of each section adjacent its entrance end at the point Y. This is to allow the entrance of a vehicle into a section adjacent an occupied section at unretarded speed as in my preferred form, whereby maximum track capacity is obtained. I accomplish the above by shunting a winding 56 across the track rails of each section at point Y, which is substantially maximum braking distance from the exit end of the section. The winding 56 surrounds a laminated iron core $t'$, while encircling another portion of the core is a winding 58 which is directly connected to the mains 52. In series with winding 56 is a condenser 57, this winding and condenser being tuned to resonance at the high frequency signaling current supplied to the track rails by transformer $T^2$ when the iron core $t'$ is saturated due to the presence of current in winding 58. The winding 58 performs the same function as winding 53 of transformer $T^2$, in that the presence of low frequency alternating current therein periodically saturates the core $t'$, thus causing the high frequency impedance of the shunt across the track rails to be periodically varied, thereby periodically varying the amplitude of the high frequency current in the track rails supplied by transformer $T^2$. It is apparent that current of varying amplitude will be supplied to the rails of each section from the entrance end thereof to point Y, irrespective of traffic conditions in the section in advance.

The vehicle-carried apparatus shown in this figure and which is also shown diagrammatically, is adapted to respond to the signaling means supplied to the rails of each section by the above described apparatus for continuously controlling the speed and progress of the vehicle in all of the sections. The vehicle apparatus in this instance comprises two relays P and P', the former being responsive to the high frequency current and the latter to the periodic variations in amplitude of the high frequency current. These relays in turn control magnets 22 and 37, which magnets control the same apparatus as do the corresponding magnets, as in Fig. 2, whereby the speed and progress of the vehicle is governed. To select and amplify the signaling frequency and its periodic variation, to properly energize the respective relays P and P', and thus positively actuate their respective contacts, I employ the usual coil 9 which is arranged in inductive relation to the track rails H and H' in advance of the forward axle of the vehicle. The coil 9 is included in a closed circuit $a$ comprising a transformer primary 59 and a condenser 60, which circuit is resonant to current of the frequency supplied by power mains 50. To render relay P' responsive to the periodic variations of the signaling current, I connect across the terminals of condenser 60 a circuit including a condenser 61 shunted by a high resistance 62, and the grid $x^2$ and filament $f^2$ of an amplifier $Z^2$ similar to that amplifier hereinbefore described.

Sustained oscillations in the circuit $a$ will produce an oscillating difference of potention on condenser 60. Since the conducting path between grid $x^2$ and filament $f^2$ comprises negatively charged electrons emitted from the heated filament $f^2$, this path is conductive in one direction only, permitting a charge to be accumulated on condenser 61 and grid $x^2$. This change in the potential of grid $x^2$ will produce a corresponding change in the current in the plate circuit $b$ of bulb $Z^2$, comprising battery 63, primary of iron core transformer $T^7$, plate $p^2$ and filament $f^2$ since grid $x^2$ is interposed between plate $p^2$ and filament $f^2$. An increase in the amplitude of the oscillations in circuit $a$ will therefore produce a change in the current in the primary of $T^7$, resulting in a momentary flow of current in the circuit comprising the secondary of $T^7$ and relay P'. A decrease in the amplitude of the oscillations in circuit $a$, by permitting the charge upon condenser 61 and grid $x^2$ to leak off through high resistance 62, will likewise produce an opposite change in the current in circuit $b$ and a momentary flow of current in the opposite direction in the secondary of $T^7$ and in relay P'. It is therefore evident that low frequency periodic variations in the amplitude of the oscillations in circuit $a$ induced by low frequency periodic variations in the amplitude of the current in the track rails H and H' will result in the production of alternating current in the circuit of relay P' to energize said relay to hold its contacts 39' closed. It is also evident that oscillations of constant amplitude in circuit $a$ will produce no effect upon relay P', because the high frequency current in circuit $b$ due to oscillations in circuit $a$ will be cut down to a negligible value by the high impedance of transformer $T^7$, and because relay P', which is preferably of a usual low-frequency type, is not operable by high frequency current.

Relay P' may therefore respond to the presence of low frequency current on the vehicle which is derived from a low frequency source in the trackway, but since the transmission of signals from the trackway to the vehicle comprises means responsive only to high frequency current, relay P' will be immune to direct influence from low frequency signaling or propulsion currents in the track rails due to the selectivity of the tuned circuit $a$. Coupled to the transformer coil 59, in circuit $a$, is a secondary coil 64 in a resonant circuit $c$ tuned by means of a condenser 65 to resonance at the frequency of the high frequency signaling current. Connected across the terminals of the condenser 65 is the grid $x^3$, and the filament $f^3$ of an amplifier $Z^3$. The plate circuit of the amplifier includes filament $f^3$, battery 49, the plate $p^3$ and the primary of a transformer $T^6$, this circuit being tuned to the high frequency current by means of a condenser $65^a$. The action of amplifier $Z^3$ is identical with that of amplifier Z previously described in connection with Fig. 2. The secondary of transformer $T^6$ is in a circuit tuned to the high frequency current and comprising condenser 66 and relay P. Relay P, therefore, receives and responds to current corresponding in frequency to the high frequency signaling current, whether said current is constant or is periodically varying in amplitude.

The relays P and P' are designed to operate contacts 39' for controlling the passage of current from a battery 38' through suitable circuits for energizing the control magnets 22 and 37 as in Fig. 2, the arrangement of circuits in this instance differing from those in Fig. 2 whereby a more simple control of the magnets is obtained. It is thought that a tracing of the circuits and their connections with the controlling magnets is unnecessary, suffice it to say that magnet 37 is energized by the upper contact point of relay P, while magnet 22 is energized through the upper contact points of both relay P and P'. In this embodiment of my invention I also employ manually operated means for controlling the energization of magnets 37 which is similar to that shown in Fig. 2 and consists of a stop release relay 40, contacts 41 and key 42. The circuits of relay 40 are so interconnected with the circuits controlling the magnets that in the event magnet 37 is deënergized, due to the deënergization of relay P, this magnet may be energized and maintained in such condition as long as P is deënergized by energizing relay 40 by the actuation of the key 42.

Having described the track and vehicle-carried apparatus shown in Fig. 3, I will now briefly describe the operation of the same. Assuming that block section B—C is occupied by a vehicle V, relay R' is deënergized to release the contact 55 whereby the transmission of the low frequency current through the winding 53 will be discontinued, thus causing the block section A—B next in the rear to lose the periodic variations of the high frequency current supplied by the secondary of transformer $T^2$; such periodic variation is however still supplied by virtue of the resonant shunt comprising coil 56 and condenser 57 at Y, as controlled by the supply of low frequency current to coil 58. Under these conditions, a vehicle V' entering section A—B is supplied with both signaling frequencies to energize both relays P and P' and consequently magnets 22 and 37, irrespective of traffic conditions in the section in advance. When the vehicle passes point Y, however, the periodic variations are discontinued, because the resonant shunt is cut off by the wheels and axles of vehicle V', thus causing a deënergization of the relay P' and consequently control magnet 22 to permit the operation of the speed controlling apparatus as described in my preferred form. Point Y being located at maximum braking distance from the exit end of the section, the speed control is so regulated as to cause a complete stopping of the vehicle upon reaching the exit end, providing the section in advance is still occupied. It is to be understood, as in my preferred form, that upon the clearing of the section in advance the speed control of the vehicle becomes ineffective immediately whereby the vehicle may again resume its maximum speed.

In the form shown in Fig. 3 the two frequencies for energizing relays P and P' preferably differ widely in frequency, while in the preferred form shown in Fig. 1 the two frequencies for energizing relays P and P' preferably differ but slightly in frequency.

It is to be noted that the two superimposed currents differing in frequency in the track rails in the form of my invention shown in Fig. 1, if differing but slightly in frequency will combine to form a single resultant current of periodically varying amplitude in accordance with the well known "beat" phenomena; consequently, the vehicle apparatus shown in Fig. 3 which comprises means responsive to high frequency current and to periodic variations in said currents may be so constructed as to be operative in conjunction with the trackway apparatus of Fig. 1, in which the source of energy comprises high frequency current of a single frequency or of two superimposed frequencies. Conversely, since a current of periodically varying amplitude may be resolved into two components of constant amplitude but differing in frequency, the vehicle apparatus of Fig. 2 embodying means responsive selectively to two high frequency currents, may be so constructed as to be operative in conjunction with the trackway apparatus of Fig. 3 in which the source of energy comprises high frequency current of a single frequency having a constant amplitude or a periodically varying amplitude.

Fig. 4 illustrates a modification of the system shown in Fig. 1, and is identical in so far as concerns the roadside signals and supplying of each block section at its exit end with high frequency signal currents $g$ and $g'$. This system differs from the system in Fig. 1, however, in that instead of supplying each section at point Y with a signaling current $g'$, I employ a third frequency $g''$, supplied from a third generator $G''$, through a transformer $T''$. The main object of employing three frequencies is to provide means for actuating three vehicle-carried visual signals, in addition to the usual speed controlling means whereby the operator of a vehicle may be adequately warned of existing traffic conditions simultaneously with the actuation of the speed controlling means. The vehicle-carried apparatus shown in Fig. 5 comprises the usual coil 9 and condenser 60 included in a circuit $a$ which is resonant to the mean of the three frequencies $g$, $g'$ and $g''$. This circuit contains the primaries of transformers $T^8$, $T^9$, and $T^{10}$, while the secondaries thereof are included in circuits selectively responsive to the respective frequencies by virtue of the tuning condensers 46, 47 and 48, and containing amplifying means as in the other forms of my invention, whereby each signaling frequency may be selected and amplified and conveyed to the respective relay. The frequencies $g$ and $g'$ energize the usual relays P and P', while the third frequency $g''$ energizes the relay P''. In connection with the relays, I employ the usual controlling magnets 22 and 37 for the speed control as described in Fig. 2 and in addition thereto the lamp signals $L^G$, $L^Y$ and $L^R$, indicating "proceed," "caution," and "stop," respectively. The relay P has a contact 68 having two contact points; P' has two contacts 69 and 70, the latter contact having two contact points, while relay P'' controls a single contact 71. The contacts of these relays control the flow of current from a battery 72 through suitably arranged circuits connecting the magnets 22 and 37 and the signals $L^G$, $L^Y$ and $L^R$.

In operation, a vehicle carrying the above described apparatus on entering block section A—B, assuming section C—D is occupied, will receive all of the three frequencies supplied to the track rails, thus energizing all of the relays and actuating the respective contacts of the relays to energize the magnets 22 and 37 and the signal $L^G$. The train upon passing point Y in section A—B loses frequency $g''$, which causes the deënergization of relay P'' and the dropping of contact 71, but owing to the arrangement of this contact with respect to the circuits, it will be obvious that no change occurs in the condition of the magnets and signals. The train upon entering section B—C loses frequency $g'$ and regains frequency $g''$, thus causing the contacts 69 and 70 to drop and the contact 71 to pick up the contact 70 dropping to its lower point to extinguish signal $L^G$ and illuminate signal $L^Y$, while the control magnets 22 and 37 remain energized. After the train passes point Y in section B—C it again loses frequency $g''$, dropping contact 71 and thus deënergizing speed control magnet 22 whereby the speed control apparatus will become effective to cause the gradual retardation of the train to a minimum speed, as in the system shown in Figs. 1 and 2. The train upon passing from section B—C to section C—D loses frequency $g$ which deënergizes magnet 37 by dropping the contact 68, thus causing the absolute stopping of the train. When the contact 68 is released, it disconnects signal $L^Y$ from battery 72 and engages its lower contact to cause the illumination of signal $L^R$. In this embodiment I also employ a stop release relay 40 which is suitably connected to the circuits controlling the magnets and signals to permit the train to resume its minimum speed under control after passing point C.

From the foregoing description, taken in connection with the accompanying drawings, it will be manifest that I have devised various systems for obtaining continuous control of a vehicle in a block section to and for securing maximum track capacity of railways.

Having thus described my invention, what I claim is:

1. In combination, a railway track divided into block sections, sources of current differing in character connected with the rails of each section adjacent the exit end thereof, means for controlling the supply of one of said currents in accordance with traffic conditions in advance of the section, means for supplying current of the latter character to the rails of each section at substantially the maximum braking distance in the rear of the exit end of the section, a railway vehicle, and controlling means thereon responsive to the combined effect of both currents to permit unretarded movement of the vehicle and responsive to current of the character not supplied to the second point in each section to impose a gradually decreasing limit speed on the vehicle in substantial accordance with the braking power of the vehicle.

2. A railway signaling system comprising block sections, means for impressing a current of one character in all of the sections, means for impressing current of another character upon each section and controllable by traffic conditions in the adjacent section, means for impressing current of the last-mentioned character upon a portion of each section irrespective of traffic conditions, and vehicle-carried signaling means responsive to said currents.

3. A railway signaling system comprising block sections, means for impressing a current of one character upon all of the block sections, means controllable by the presence of a vehicle in one block section for impressing current of another character at one point in the adjacent section, means for constantly impressing current of the last-mentioned character at another point in the said adjacent section irrespective of traffic conditions, and vehicle-carried signaling means responsive to said currents.

4. A railway signaling system comprising block sections, means for impressing a current of one character upon all of the block sections, means controllable by traffic conditions in one block section for impressing current of another character at one point in the adjacent section, means for constantly impressing current of the last-mentioned character at another point in the said adjacent section irrespective of traffic conditions, and vehicle-carried signaling means responsive to said currents.

5. A railway signaling system comprising block sections, means for impressing a current of one character upon each section, means for impressing current of another character upon each section, the last-mentioned current having two points of connection, one of which is controlled by traffic conditions, and vehicle-carried speed controlling means controllable by said currents.

6. In combination, a railway signaling system comprising block sections, means for impressing signaling currents of different characters upon each section, the impressing of one current being controlled by traffic conditions, means for constantly impressing upon each block section a current of the last-mentioned character irrespective of traffic conditions, and vehicle-carried speed control means responsive in the absence of the second mentioned current.

7. A railway signaling system comprising block sections, means for impressing a current of one character upon all of the sections, means for impressing current of another character upon the sections, the last-mentioned current being supplied at two points in each section, and traffic controlled means for disconnecting the current of the last-mentioned character from one of said points in each section.

8. A method of controlling traffic in a block section which consists in impressing at one point in the section current of one character and impressing currents of different characters at a point remote from the last-mentioned point, one of said latter currents being of the same character as the first-mentioned current and arranged to be rendered inactive under certain traffic conditions.

9. A railway signaling system comprising block sections, means for impressing a plurality of currents of different characters at different points within each of the block sections, one of the currents for each section being rendered inactive when the adjacent section is occupied.

10. The method of increasing track capacity for railway block sections which consists of supplying each section with means for admitting a train into a section adjacent an occupied section at unretarded speed for a portion of the section and to effect a control of the train after having passed said portion of the section.

11. The method of increasing track capacity for railway block sections which consists of supplying each section with electrical means for admitting a train into a section adjacent an occupied section at unretarded speed for a portion of the section and to effect a control of the train after having passed said portion of the section, said control being dependent upon advance traffic conditions.

12. A railway signaling system comprising block sections, means for impressing alternating currents of different frequencies upon each section, one of the currents having two connections, one of which is controllable by traffic conditions in advance, and vehicle-carried speed controlling means controllable by said currents.

13. In combination, a traffic controlling system for railways including block sections, means for impressing current of one character on each section, means for impressing a current of a different character at one point in each section, means for impressing current of the last-mentioned character at another point in each section and controllable by traffic conditions, roadside signals, traffic-controlled means for actuating said signals independent of said currents, and vehicle-carried speed control means selectively responsive to said currents.

14. A traffic controlling system comprising block sections, means for constantly supplying signaling current of one character to each section, and vehicle-controlled means for at times supplying signaling current of another character to each section.

15. A traffic controlling system comprising block sections, means in each section for admitting a train into a section adjacent an occupied section at unretarded speed for a portion of the section, and means for controlling said train after having passed said portion of the section.

16. A traffic controlling system comprising block sections, means for impressing currents of different characters at one point in each section, means for impressing one of said currents at another point in each section, a railway vehicle, vehicle-governing means on the vehicle, speed and time controlled means on the vehicle for controlling said governing means, circuits on said vehicle resonant to said currents, and selectively responsive means in said circuits and controlling said time and speed controlled means.

17. A traffic controlling system comprising block sections, means for impressing currents of different characters at one point in each section, means for impressing one of said currents at another point in each section, a railway vehicle, vehicle-governing means on the vehicle, speed and time controlled means on the vehicle for controlling said governing means, circuits on said vehicle resonant to said currents, selectively responsive means in said circuits and controlling said time and speed controlled means, and vehicle-carried signals selectively actuated by said currents.

18. A traffic controlling system comprising block sections, means in each section for admitting a train into a section adjacent an occupied section at unretarded speed for a portion of the section, and means for effecting a stopping of the train after having passed said portion of the section.

19. A traffic controlling system comprising block sections, means in each section for admitting a train into a section adjacent an occupied section at unretarded speed for a portion of the section, means for effecting a stopping of the train after having passed said portion of the section, and train carried speed and time controlled means for controlling the last-mentioned means.

20. A traffic controlling system comprising block sections, means in each section for admitting a train into a section adjacent an occupied section at unretarded speed for a portion of the section, and means for effecting a stopping of the train after having passed said portion of the section, the last-mentioned means being controllable by traffic conditions in advance.

21. A traffic controlling system comprising block sections, means for supplying signaling currents of different characters at one point in each of the sections, means for supplying one of said currents at another point in each section irrespective of traffic conditions, and vehicle-carried apparatus comprising governing means, circuits resonant to said currents, and selectively responsive devices in said circuits, said devices being adapted to effect a control of said governing means.

22. In combination with a railway signaling system comprising block sections having means for impressing signaling currents of different characters upon each section, the impressing of one current being controlled by traffic conditions, and means for constantly impressing upon each block section a current of the last-mentioned character irrespective of traffic conditions, of a vehicle-carried apparatus comprising a governing means, speed and time controlled means for controlling said governing means, electro-responsive devices selectively responsive to said currents respectively, certain of said devices controlling said speed and time controlled means, the remaining devices controlling said governing means independently of the speed and time controlled means, and manually operated means for releasing the devices controlling said governing means.

23. In combination, a railway track divided into block sections, means for supplying to each section adjacent the exit end thereof alternating currents differing in frequency, means for controlling the supply of one of said currents in accordance with traffic conditions in advance of the section, means for supplying current of the latter character to the rails of each section at substantially the maximum braking distance in the rear of the exit end of the section, a railway vehicle, a controlling means thereon responsive to the combined effect of both currents to permit unretarded movement of the vehicle and responsive to current of the character not supplied to the second point in each section to impose a gradual decreasing limit speed on the vehicle in substantial accordance with the stopping power of the vehicle.

24. In combination, a railway track divided into block sections, means for supplying to each section adjacent the exit end thereof alternating currents differing in frequency, means for controlling the supply of one of said currents in accordance with traffic conditions in advance of the section, means for supplying current of the latter character to the rails of each section at substantially the maximum braking distance in the rear of the exit end of the section, a railway vehicle, a controlling means thereon responsive to the combined effect of both currents to permit unretarded movement of the vehicle and responsive to current of the character not supplied to the second point in each section to impose a gradual decreasing limit speed on the vehicle in substantial accordance with the stopping power of the vehicle.

In testimony whereof I affix my signature in presence of two witnesses.

LLOYD V. LEWIS.

Witnesses:
 A. HERMAN WEGNER,
 C. R. REALL.